(12) United States Patent
Sullivan et al.

(10) Patent No.: US 11,841,956 B2
(45) Date of Patent: Dec. 12, 2023

(54) SYSTEMS AND METHODS FOR DATA LIFECYCLE PROTECTION

(71) Applicant: Dover Microsystems, Inc., Wayland, MA (US)

(72) Inventors: Gregory T. Sullivan, Auburndale, MA (US); Jonathan B. Rosenberg, Wayland, MA (US)

(73) Assignee: Dover Microsystems, Inc., Wayland, MA (US)

( * ) Notice: Subject to any disclaimer, the term of this patent is extended or adjusted under 35 U.S.C. 154(b) by 248 days.

(21) Appl. No.: 17/312,675

(22) PCT Filed: Dec. 18, 2019

(86) PCT No.: PCT/US2019/067084
§ 371 (c)(1),
(2) Date: Jun. 10, 2021

(87) PCT Pub. No.: WO2020/132012
PCT Pub. Date: Jun. 25, 2020

(65) Prior Publication Data
US 2022/0050904 A1    Feb. 17, 2022

Related U.S. Application Data

(60) Provisional application No. 62/781,520, filed on Dec. 18, 2018.

(51) Int. Cl.
*G06F 21/60*    (2013.01)
*G06F 21/62*    (2013.01)
(Continued)

(52) U.S. Cl.
CPC ........ *G06F 21/602* (2013.01); *G06F 21/6209* (2013.01); *G06F 21/78* (2013.01); *H04L 67/1097* (2013.01)

(58) Field of Classification Search
CPC .... G06F 21/602; G06F 21/6209; G06F 21/78; H04L 67/1097
See application file for complete search history.

(56) References Cited

U.S. PATENT DOCUMENTS 5,201,056 A    4/1993  Daniel et al.
5,377,336 A    12/1994 Eickemeyer et al.
(Continued)

FOREIGN PATENT DOCUMENTS

CN    101558388 A    10/2009
CN    102160033 A    8/2011
(Continued)

OTHER PUBLICATIONS

International Search Report and Written Opinion for International Application No. PCT/US2022/042492 dated Jan. 11, 2023.
(Continued)

*Primary Examiner* — Vance M Little
(74) *Attorney, Agent, or Firm* — Wolf, Greenfield & Sacks, P.C.

(57) ABSTRACT

Systems and methods for metadata processing. The method comprises acts of associating, in a first system, metadata with application data processed by a host processor, wherein the application data is protected within the first system by one or more first policies using the metadata, and transferring the application data and its associated metadata to a second system in which the application data is unprotected using metadata processing or is protected by one or more second policies different from the one or more first policies.

29 Claims, 5 Drawing Sheets

(51) Int. Cl.
   *G06F 21/78*      (2013.01)
   *H04L 67/1097*    (2022.01)

(56) References Cited

U.S. PATENT DOCUMENTS

| | | |
|---|---|---|
| 5,488,730 A | 1/1996 | Brown, III et al. |
| 5,521,910 A | 5/1996 | Matthews |
| 5,559,952 A | 9/1996 | Fujimoto |
| 5,655,100 A | 8/1997 | Ebrahim et al. |
| 5,664,197 A | 9/1997 | Kardach et al. |
| 5,664,223 A | 9/1997 | Bender et al. |
| 5,684,977 A | 11/1997 | Van Loo et al. |
| 5,764,946 A | 6/1998 | Tran et al. |
| 5,778,423 A | 7/1998 | Sites et al. |
| 5,848,433 A | 12/1998 | Tran et al. |
| 5,890,008 A | 3/1999 | Panwar et al. |
| 5,941,981 A | 8/1999 | Tran |
| 6,014,734 A | 1/2000 | Tran et al. |
| 6,035,374 A | 3/2000 | Panwar et al. |
| 6,058,466 A | 5/2000 | Panwar et al. |
| 6,240,502 B1 | 5/2001 | Panwar et al. |
| 6,269,436 B1 | 7/2001 | Tran et al. |
| 6,298,432 B1 | 10/2001 | Goto |
| 6,321,297 B1 | 11/2001 | Shamanna et al. |
| 6,324,599 B1 | 11/2001 | Zhou et al. |
| 6,351,784 B1 | 2/2002 | Neal et al. |
| 6,438,673 B1 | 8/2002 | Jourdan et al. |
| 6,449,714 B1 | 9/2002 | Sinharoy |
| 6,549,903 B1 | 4/2003 | Babaian et al. |
| 6,549,959 B1 | 4/2003 | Yates et al. |
| 6,622,182 B1 | 9/2003 | Miller et al. |
| 6,625,146 B1 | 9/2003 | Merchant et al. |
| 6,636,523 B1 | 10/2003 | Lau et al. |
| 6,748,589 B1 | 6/2004 | Johnson et al. |
| 6,922,740 B2 | 7/2005 | Kondratiev et al. |
| 6,976,147 B1 | 12/2005 | Isaac et al. |
| 7,047,394 B1 | 5/2006 | Van Dyke et al. |
| 7,058,918 B2 | 6/2006 | Abramovici et al. |
| 7,095,783 B1 | 8/2006 | Sotheran et al. |
| 7,137,086 B2 | 11/2006 | Abramovici |
| 7,146,548 B1 | 12/2006 | Abramovici |
| 7,213,247 B1 | 5/2007 | Wilner et al. |
| 7,263,572 B2 | 8/2007 | Hiji |
| 7,296,201 B2 | 11/2007 | Abramovici |
| 7,301,541 B2 | 11/2007 | Hansen et al. |
| 7,305,635 B1 | 12/2007 | Abramovici et al. |
| 7,313,820 B2 | 12/2007 | Kilroy |
| 7,340,469 B1 | 3/2008 | Alghathbar et al. |
| 7,348,796 B2 | 3/2008 | Crouch et al. |
| 7,426,705 B1 | 9/2008 | Kolaric |
| 7,430,650 B1 | 9/2008 | Ross |
| 7,434,002 B1 | 10/2008 | Zedlewski et al. |
| 7,467,414 B2 | 12/2008 | Schlesinger |
| 7,487,264 B2 | 2/2009 | Pandya |
| 7,493,247 B2 | 2/2009 | Memmi |
| 7,493,434 B1 | 2/2009 | Abramovici |
| 7,574,536 B2 | 8/2009 | Johnsen et al. |
| 7,580,914 B2 | 8/2009 | Wang et al. |
| 7,581,064 B1 | 8/2009 | Zedlewski et al. |
| 7,631,107 B2 | 12/2009 | Pandya |
| 7,688,838 B1 | 3/2010 | Aloni et al. |
| 7,698,402 B2 | 4/2010 | Santos et al. |
| 7,813,342 B2 | 10/2010 | Gadelrab |
| 7,886,148 B2 | 2/2011 | Kiriansky et al. |
| 8,074,052 B2 | 12/2011 | Iadonato et al. |
| 8,121,828 B2 | 2/2012 | Yates, Jr. et al. |
| 8,127,121 B2 | 2/2012 | Yates, Jr. et al. |
| 8,131,663 B1 | 3/2012 | Taylor |
| 8,131,762 B2 | 3/2012 | Smetters et al. |
| 8,166,404 B2 | 4/2012 | Grinstein |
| 8,181,219 B2 | 5/2012 | Golan et al. |
| 8,271,447 B1 | 9/2012 | Natanzon et al. |
| 8,326,774 B2 | 12/2012 | Candelore |
| 8,335,754 B2 | 12/2012 | Dawson et al. |
| 8,346,760 B2 | 1/2013 | Wang et al. |
| 8,364,910 B2 | 1/2013 | Wilkerson et al. |
| 8,380,933 B2 | 2/2013 | Uchiyama |
| 8,423,720 B2 | 4/2013 | Döring |
| 8,516,193 B1 | 8/2013 | Clinton et al. |
| 8,543,606 B2 | 9/2013 | Pulfer et al. |
| 8,572,410 B1 | 10/2013 | Tkacik et al. |
| 8,677,457 B2 | 3/2014 | Fullerton |
| 8,701,200 B2 | 4/2014 | Naldurg et al. |
| 8,738,860 B1 | 5/2014 | Griffin et al. |
| 8,756,185 B2 | 6/2014 | Dawson et al. |
| 8,788,792 B2 | 7/2014 | Yates, Jr. et al. |
| 8,826,391 B2 | 9/2014 | Tkacik et al. |
| 8,843,734 B2 | 9/2014 | Lim |
| 8,904,477 B2 | 9/2014 | Barton et al. |
| 8,874,850 B1 | 10/2014 | Goodson et al. |
| 8,875,170 B1 | 10/2014 | Daniel |
| 8,887,230 B2 | 11/2014 | Barton et al. |
| 8,938,783 B2 | 1/2015 | Becker et al. |
| 9,026,733 B1 | 5/2015 | Clinton et al. |
| 9,047,178 B2 | 6/2015 | Talagala et al. |
| 9,087,200 B2 | 7/2015 | McKeen et al. |
| 9,165,078 B2 | 10/2015 | Bester et al. |
| 9,208,082 B1 | 12/2015 | Cheriton et al. |
| 9,219,752 B2 | 12/2015 | Balinksy et al. |
| 9,251,052 B2 | 2/2016 | Talagala et al. |
| 9,311,093 B2 | 4/2016 | Gschwind et al. |
| 9,317,708 B2 | 4/2016 | Lee et al. |
| 9,323,684 B2 | 4/2016 | Koker et al. |
| 9,467,474 B2 | 10/2016 | Barton et al. |
| 9,507,589 B2 | 11/2016 | Rao et al. |
| 9,507,598 B1 | 11/2016 | Bonnano et al. |
| 9,513,884 B2 | 12/2016 | Bates et al. |
| 9,525,606 B1 | 12/2016 | Staggs et al. |
| 9,571,509 B1 | 2/2017 | Satish et al. |
| 9,576,147 B1 | 2/2017 | McClintock et al. |
| 9,665,603 B2 | 5/2017 | Bester et al. |
| 9,680,736 B2 | 6/2017 | Kamboh |
| 9,680,738 B2 | 6/2017 | Jackson et al. |
| 9,703,956 B1 | 7/2017 | Watson et al. |
| 9,736,185 B1 | 8/2017 | Belamaric et al. |
| 9,785,440 B2 | 10/2017 | DeHon |
| 9,792,472 B1 | 10/2017 | Robshaw et al. |
| 9,906,557 B2 | 2/2018 | Hsiung et al. |
| 9,953,095 B1 | 4/2018 | Scott et al. |
| 10,073,977 B2 | 9/2018 | Pappachan et al. |
| 10,078,763 B2 | 9/2018 | Chiricescu et al. |
| 10,114,958 B2 | 10/2018 | Sell |
| 10,133,866 B1 | 11/2018 | Kumar et al. |
| 10,152,330 B2 | 12/2018 | Chiricescu et al. |
| 10,235,176 B2 | 3/2019 | DeHon et al. |
| 10,261,794 B2 | 4/2019 | DeHon |
| 10,424,043 B1 | 9/2019 | Koston et al. |
| 10,503,904 B1 | 12/2019 | Singh et al. |
| 10,521,230 B2 | 12/2019 | DeHon |
| 10,545,760 B2 | 1/2020 | DeHon |
| 10,642,616 B2 | 5/2020 | DeHon et al. |
| 10,642,753 B1 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,635,960 B2 | 4/2023 | DeHon |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |

(56) References Cited

U.S. PATENT DOCUMENTS

| | | |
|---|---|---|
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 | 8/2005 | Metzger et al. |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 | 10/2007 | Reeves et al. |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0201333 A1 | 8/2008 | Rowley |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 | 6/2009 | Samudrala et al. |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332456 A1* | 12/2010 | Prahlad ............... G06F 16/1748 |
| | | 713/160 |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0255018 A1 | 10/2012 | Sallam |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0312099 A1 | 11/2013 | Edwards et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |

(56) References Cited

U.S. PATENT DOCUMENTS

| | | |
|---|---|---|
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1 | 5/2018 | Ogawa et al. |
| 2018/0189062 A1 | 7/2018 | Baghsorkhi et al. |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0406028 A1 | 12/2021 | Boling et al. |
| 2021/0406137 A1 | 12/2021 | Sutherland et al. |
| 2022/0012329 A1 | 1/2022 | Boling et al. |
| 2022/0043654 A1 | 2/2022 | DeHon et al. |
| 2022/0092173 A1 | 3/2022 | Sutherland et al. |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |
| 2023/0054942 A1 | 2/2023 | Milburn et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A1 | 6/2017 |
| WO | WO 2017/106103 A2 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

U.S. Appl. No. 16/966,616, Boling et al., filed Jul. 31, 2020.
U.S. Appl. No. 16/966,863, Milburn et al., filed Jul. 31, 2020.
U.S. Appl. No. 17/051,741, Sutherland et al., filed Oct. 29, 2020.
U.S. Appl. No. 16/966,865, Milburn et al., filed Jul. 31, 2020.
U.S. Appl. No. 17/507,398, Milburn et al., filed Oct. 21, 2021.
U.S. Appl. No. 15/168,689, DeHon et al., filed May 31, 2016.
U.S. Appl. No. 15/426,098, DeHon, filed Feb. 7, 2017.
U.S. Appl. No. 15/624,878, DeHon et al., filed Jun. 16, 2017.
U.S. Appl. No. 15/695,541, DeHon, filed Sep. 5, 2017.
U.S. Appl. No. 16/002,642, DeHon et al., filed Jun. 7, 2018.
U.S. Appl. No. 16/002,757, DeHon et al., filed Jun. 7, 2018.
U.S. Appl. No. 16/002,957, DeHon, filed Jun. 7, 2018.
U.S. Appl. No. 16/002,987, DeHon, filed Jun. 7, 2018.
U.S. Appl. No. 16/062,791, DeHon et al., filed Jun. 15, 2018.
U.S. Appl. No. 16/256,640, DeHon et al., filed Jan. 24, 2019.
U.S. Appl. No. 16/684,172, DeHon, filed Nov. 14, 2019.
U.S. Appl. No. 16/905,680, DeHon, filed Jun. 18, 2020.
U.S. Appl. No. 16/929,692, DeHon, filed Jul. 15, 2020.
U.S. Appl. No. 16/062,796, DeHon et al., filed Jun. 15, 2018.
U.S. Appl. No. 16/264,773, Milburn et al., filed Feb. 1, 2019.
U.S. Appl. No. 17/474,830, Milburn et al., filed Sep. 14, 2021.
U.S. Appl. No. 17/292,694, Boling et al., filed May 10, 2021.
U.S. Appl. No. 17/423,701, Sutherland et al., filed Jul. 16, 2021.
U.S. Appl. No. 16/966,866, Boling et al., filed Jul. 31, 2020.
U.S. Appl. No. 17/308,868, Milburn et al., filed May 5, 2021.
U.S. Appl. No. 17/452,271, DeHon, filed Oct. 26, 2021.
U.S. Appl. No. 17/560,975, Boling et al., filed Dec. 23, 2021.
U.S. Appl. No. 17/711,092, Boling et al., filed Apr. 1, 2022.
U.S. Appl. No. 17/720,035, Boling et al., filed Apr. 13, 2022.
U.S. Appl. No. 17/769,868, Boling et al., filed Apr. 18, 2022.
U.S. Appl. No. 17/774,799, Sutherland et al., filed May 5, 2022.
International Search Report and Written Opinion for International Application No. PCT/US2019/016242 dated Mar. 29, 2019.
International Search Report and Written Opinion for International Application No. PCT/US2016/066194 dated Apr. 7, 2017.

(56) References Cited

OTHER PUBLICATIONS

International Search Report and Written Opinion for International Application No. PCT/US2016/066188 dated Jul. 13, 2017.
Invitation to Pay Additional Fees for International Application No. PCT/US2019/016295 dated May 3, 2019.
International Search Report and Written Opinion for International Application No. PCT/US2019/016295 dated Jun. 26, 2019.
International Preliminary Report on Patentability for International Application No. PCT/US2019/016295 dated Aug. 13, 2020.
International Search Report and Written Opinion for International Application No. PCT/US2019/016276 dated Apr. 26, 2019.
International Search Report and Written Opinion for International Application No. PCT/US2019/029880 dated Aug. 8, 2019.
International Search Report and Written Opinion for International Application No. PCT/US2019/016317 dated Apr. 16, 2019.
International Search Report and Written Opinion for International Application No. PCT/US2020/059057 dated Feb. 8, 2021.
International Search Report and Written Opinion for International Application No. PCT/US2019/060030 dated May 20, 2021.
International Search Report and Written Opinion for International Application No. PCT/US2019/060698 dated May 20, 2021.
International Search Report and Written Opinion for International Application No. PCT/US2019/067084 dated Jul. 1, 2021.
International Search Report and Written Opinion for International Application No. PCT/US2019/013678 dated Jul. 29, 2021.
Invitation to Pay Additional Fees for International Application No. PCT/US2019/013678 dated Apr. 15, 2020.
International Search Report and Written Opinion for International Application No. PCT/US2021/020602 dated May 11, 2021.
International Search Report and Written Opinion for International Application No. PCT/US2020/055952 dated Jan. 28, 2021.
International Preliminary Report on Patentability for International Application No. PCT/US2019/060028 dated May 20, 2021.
International Search Report and Written Opinion for International Application No. PCT/US2019/060028 dated Mar. 23, 2020.
International Search Report and Written Opinion for International Application No. PCT/US2019/016272 dated Apr. 8, 2019.
International Preliminary Report on Patentability for International Application No. PCT/US2019/016272 dated Aug. 13, 2020.
International Preliminary Report on Patentability for International Application No. PCT/US2019/016276 dated Aug. 13, 2020.
International Preliminary Report on Patentability for International Application No. PCT/US2019/029880 dated Nov. 12, 2020.
International Preliminary Report on Patentability for International Application No. PCT/US2019/016317 dated Aug. 13, 2020.
International Preliminary Report on Patentability for International Application No. PCT/US2020/055952 dated Aug. 13, 2020.
[No Author Listed], Arm Limited: AMBA® AXI™ and ACE™ Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34th Annual International Symposium In Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
Dehon et al., DOVER A Metadata-Extended RISC-V. Jan. 6, 2016:34. [https://web.archive.org/web/20160331131339 if /http://riscv.org/wp-content/uploads/2016/01/Wed1430-dover riscv jan2016 v3.pdf].
Dehon et al., DOVER: A metadata-extended RISC-V. RISC-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., PUMP: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.
Evans et al., Melding security metadata between software and hardware. Proceedings of the Posters and Demo Track Dec. 3, 2012:1-2.
Geater, TEE requirements for ISA. Thales eSecurity. 2018. 21 pages.
Hrițcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.
Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 29, 2009:105-14.
Mambretti et al., Trellis: Privilege separation for multi-user applications made easy. International Symposium on Research in Attacks, Intrusions, and Defenses. Springer, Cham. Sep. 19, 2016:437-56.
Nagarakatte et al., SoftBound: Highly Compatible and Complete Spatial Memory Safety for C. University of Pennsylvania Department of Computer and Information Science Technical Report. Jan. 2009. 12 pages.
Okhravi et al., One Giant Leap for Computer Security. IEEE Computer and Reliability Societies. Jul./Aug. 2020;18(4):8-19.
Ozsoy et al., SIFT: A low-overhead dynamic information flow tracking architecture for smt processors. Proceedings of the 8th ACM International Conference on Computing Frontiers. May 3, 2011:1-11.
Roessler et al., Protecting the stack with metadata policies and tagged hardware. 2018 IEEE Symposium on Security and Privacy (SP) May 20, 2018;478-95.
Song et al., Security tagging for a zero-kernel operating system. 2013 46th Hawaii International Conference on System Sciences Jan. 7, 2013:5049-58.
Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].
Suh et al., Secure Program Execution via Dynamic Information Flow Tracking. MIT CSAIL. Jul. 2003. 14 pages.
Sullivan et al., The dover inherently secure processor. 2017 IEEE International Symposium on Technologies for Homeland Security (HST) Apr. 25, 2017:1-5.
Tiwari et al., A small cache of large ranges: Hardware methods for efficiently searching, storing, and updating big dataflow tags. 2008 41st IEEE/ACM International Symposium on Microarchitecture Nov. 8, 2008:94-105.

(56) References Cited

OTHER PUBLICATIONS

Tiwari et al., Complete information flow tracking from the gates up. InProceedings of the 14th international conference on Architectural support for programming languages and operating systems Mar. 7, 2009;109-20.
Waterman et al., The RISC-V Instruction Set Manual, vol. I: Unprivileged ISA, Document Version Dec. 13, 2019. RISC-V Foundation. Dec. 2019. 238 pages.
Watson et al., Cheri: A hybrid capability-system architecture for scalable software compartmentalization. 2015 IEEE Symposium on Security and Privacy Sep. 2015;20-37.
Witchel et al., Mondrian Memory Protection. ASPLOS-X. 2002;13 pages.
Woodruff, Cheri: A RISC capability machine for practical memory safety. University of Cambridge, Computer Laboratory; 2014. 112 pages.
Zeldovich et al., Hardware Enforcement of Application Security Policies Using Tagged Memory. USENIX Symposium on Operating Systems Design and Implementation. Dec. 8, 2008:8;225-40.
U.S. Appl. No. 17/880,539, Milburn et al., filed Aug. 3, 2022.
U.S. Appl. No. 17/908,879, Milburn et al., filed Sep. 1, 2022.
International Preliminary Report on Patentability for International Application No. PCT/US2020/059057, dated May 19, 2022.
International Search Report and Written Opinion for International Application No. PCT/US2019/060030 dated Mar. 19, 2020.
International Search Report and Written Opinion for International Application No. PCT/US2019/060698 dated Feb. 3, 2020.
International Search Report and Written Opinion for International Application No. PCT/US2019/067084 dated Mar. 19, 2020.
International Search Report and Written Opinion for International Application No. PCT/US2019/013678 dated Jun. 23, 2020.
International Preliminary Report on Patentability for International Application No. PCT/US2021/020602, dated Sep. 15, 2022.
International Preliminary Report on Patentability for International Application No. PCT/US2020/055952 dated Apr. 28, 2022.
Mutlu, 18-447 Computer Architecture Lecture 11: Precise Exceptions, State Maintenance, State Recovery. Carnegie Mellon University Lecture. Feb. 11, 2015, 49 pages.

* cited by examiner

SYSTEMS AND METHODS FOR DATA LIFECYCLE PROTECTION

RELATED APPLICATION

This application is a national stage filing under 35 U.S.C. § 371 of International Patent Application Serial No. PCT/US2019/067084, filed Dec. 18, 2019, which claims the benefit under 35 U.S.C. § 119(e) of U.S. Provisional Patent Application Ser. No. 62/781,520, filed on Dec. 18, 2018, titled "DATA LIFECYCLE PROTECTION," bearing Attorney Docket No. D0821.70012US00. The contents of these applications are incorporated herein by reference in their entirety.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed personal data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals race to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a method for metadata processing is provided, the method comprising acts of: associating, in a first system, metadata with application data processed by a host processor, wherein the application data is protected within the first system by one or more first policies using the metadata; and transferring the application data and its associated metadata to a second system in which the application data is unprotected using metadata processing or is protected by one or more second policies different from the one or more first policies.

In accordance with some embodiments, a method for metadata processing is provided, the method comprising acts of: receiving by a second system from a first system, application data and associated first metadata, wherein the first metadata was created in accordance with one or more first policies, and wherein the second system includes a host processor configured to use the application data; and processing the first metadata to obtain second metadata to be associated with the application data in accordance with one or more second policies used by the second system for data protection.

In accordance with some embodiments, a system is provided, comprising circuitry and/or one or more processors programmed by executable instructions, wherein the circuitry and/or the one or more programmed processors are configured to perform any of the methods described herein.

In accordance with some embodiments, at least one computer-readable medium is provided, having stored thereon at least one netlist for any of the circuitries described herein.

In accordance with some embodiments, at least one computer-readable medium is provided, having stored thereon at least one hardware description that, when synthesized, produces any of the netlists described herein.

In accordance with some embodiments, at least one computer-readable medium is provided, having stored thereon any of the executable instructions described herein.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

Figure 1:
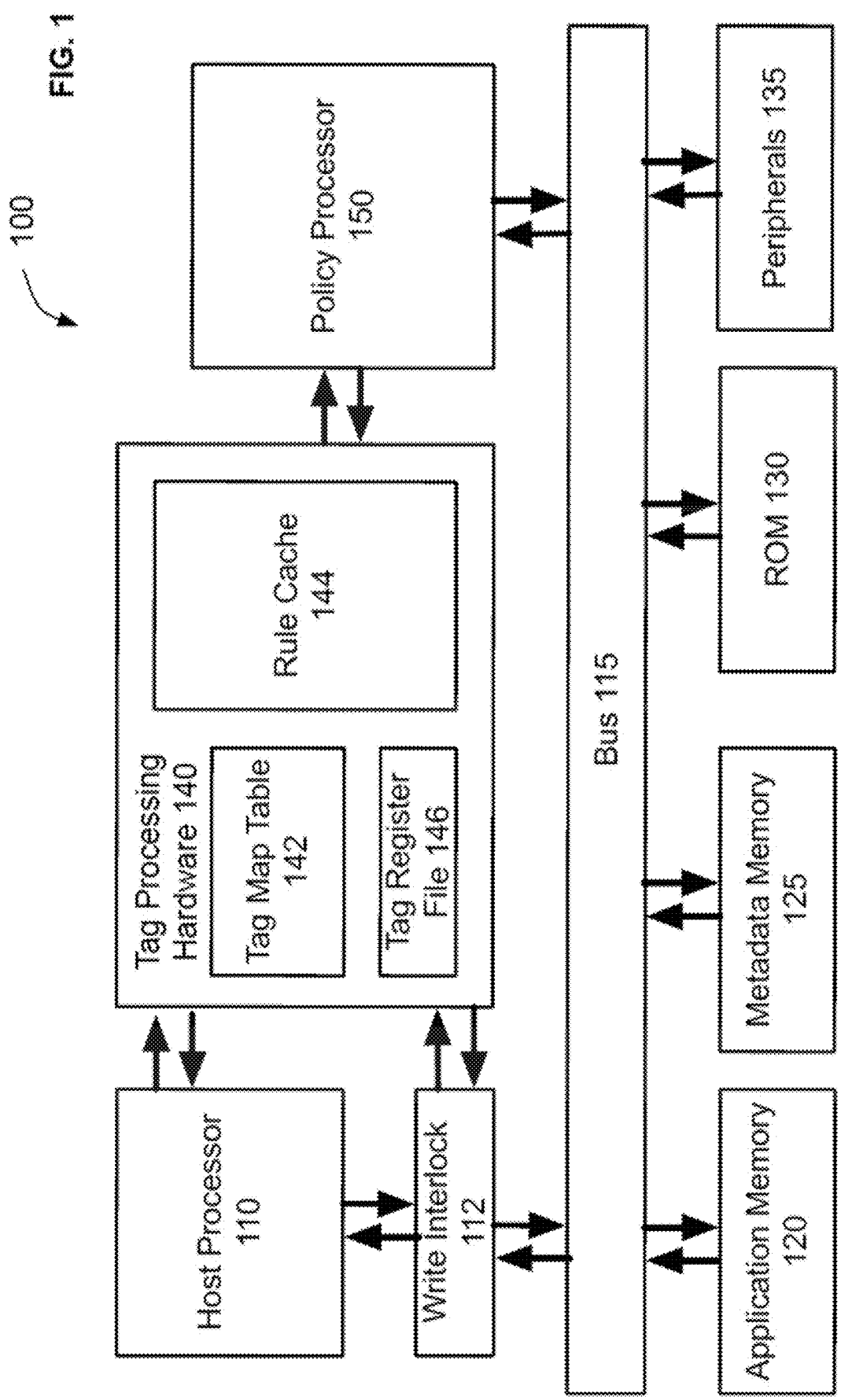
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map an address X in the application memory 120 to an address Y in the metadata memory 125. A value stored at the address Y is sometimes referred to herein as a "metadata tag" or simply a "tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags" or simply "tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, the metadata may indicate a type of the application data (e.g., integer, pointer, 16-bit word, 32-bit word, etc.). If the application data is of a particular type (e.g., a pointer, an instruction, etc.), the metadata may provide further information (e.g., where in memory the pointer is allowed to point to, whether the instruction is a jump instruction, and if so, where in memory the instruction is allowed to jump to, etc.). In yet another example, the metadata may relate to confidentiality. For instance, whether the application data is secret or public. Such metadata may be used to check whether secret data is being written to a publicly-accessible memory location (e.g., memory mapped IO). In yet another example, the metadata may relate to integrity and/or provenance. For instance, the metadata may indicate where the application data came from, whether the application data is trusted data, and if so, why the application data is trusted, etc.

Depending on a policy to be enforced, any suitable metadata relevant for the policy may be associated with a piece of application data. In some embodiments, as application data is loaded from memory to registers, processed by instructions, combined with other data, and/or written to locations in memory, metadata may flow with the application data, and may be updated in accordance with one or more policies.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata symbol "RED" may be stored at the metadata memory address Z. By storing the metadata memory address Z in the metadata memory address Y, the application data stored at the application memory address X may be tagged "RED."

In this manner, the binary representation of the metadata symbol "RED" may be stored only once in the metadata memory 125. For instance, if application data stored at another application memory address X' is also to be tagged "RED," the tag map table 142 may map the application memory address X' to a metadata memory address Y' where the metadata memory address Z is also stored.

Moreover, in this manner, tag update may be simplified. For instance, if the application data stored at the application memory address X is to be tagged "BLUE" at a subsequent time, a metadata memory address Z' may be written at the metadata memory address Y, to replace the metadata memory address Z, and a binary representation of the metadata symbol "BLUE" may be stored at the metadata memory address Z'.

Thus, the inventors have recognized and appreciated that a chain of metadata memory addresses of any suitable length N may be used for tagging, including N=0 (e.g., where a binary representation of a metadata symbol is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single tag, so that all words in that region are associated with the same metadata. This may advantageously reduce a size of the tag map table 142 and/or the metadata memory 125. For example, a single tag may be maintained for an entire address range, as opposed to maintaining multiple tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back to the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructive read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding tag. Additionally, or alternatively, for a register identifier received from the host processor 110, the tag processing hardware 140 may access a tag from a tag register file 146 within the tag processing hardware 140.

In some embodiments, if an application memory address does not have a corresponding entry in the tag map table 142, the tag processing hardware 140 may send a query to a policy processor 150. The query may include the application memory address in question, and the policy processor 150 may return a tag for that application memory address. Additionally, or alternatively, the policy processor 150 may create a new tag map entry for an address range including the application memory address. In this manner, the appropriate tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a tag for a program counter, a tag for an application memory address from which the instruction is fetched (e.g., a word in memory to which the program counter points), a tag for a register in which an operand of the instruction is stored, and/or a tag for an application memory address referenced by the instruction. In one example, the instruction may be a load instruction, and an operand of the instruction may be an application memory address from which application data is to be loaded. The query may include, among other things, a tag for a register in which the application memory address is stored, as well as a tag for the application memory address itself. In another example, the instruction may be an arithmetic instruction, and there may be two operands. The query may include, among other things, a first tag for a first register in which a first operand is stored, and a second tag for a second register in which a second operand is stored. The policy processor 150 may then process the inputs in the query determine whether the instruction should be allowed (e.g., by assessing compliance with one or more policies), as described in more detail below.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output tags) to be returned to the tag processing hardware 140. As one example, the instruction may be a store instruction, and the policy processor 150 may compute an output tag for an application memory address to which application data is to be stored. As another example, the instruction may be an arithmetic instruction, and the policy processor 150 may compute an output tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more inputs to a decision and/or one or more outputs. For instance, a query into the rule cache 144 may be similarly constructed as a query to the policy processor 150 to check if an instruction executed by the host processor 110 should be allowed. If there is a cache hit, the rule cache 144 may output a decision as to whether to the instruction should be allowed, and/or one or more output tags (e.g., as described above in connection with the policy processor 150). Such a mapping in the rule cache 144 may be created using a query response previously generated by the policy processor 150 when a query with a same combination of input tags was submitted for evaluation. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input tags, the tag processing hardware 140 may first query the rule cache 144 with the one or more input tags. In case of a cache hit, the tag processing hardware 140 may proceed with a decision and/or one or more output tags from the rule cache 144, without querying the policy processor 150. This may provide a significant speedup. In case of a cache miss (e.g., the combination of input tags in the query has not been evaluated previously by the policy processor 150), the tag processing hardware 140 may query the policy processor 150, and may install a response from the policy processor 150 into the rule cache 144 for potential future use.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output tags (e.g., as received from the rule cache 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to the application memory 120. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

The inventors have recognized and appreciated that, if an instruction in question should be allowed, it may be desirable to reduce an amount of latency associated with checking the instruction. By contrast, if the instruction in question represents a policy violation, the amount of latency associated with checking the instruction may be insignificant relative to an amount of latency associated with violation processing. Accordingly, in some embodiments, the rule cache 144 may be configured to prioritize input tag combinations that have been previously allowed by the policy processor 150. For instance, the rule cache 144 may only include entries for allowed input tag combinations. Additionally, or alternatively, an entry for a disallowed input tag combination may be evicted if space is needed for an allowed input tag combination. However, it should be appreciated that aspects of the present disclosure are not limited to prioritizing allowed input tag combinations.

Figure 3:
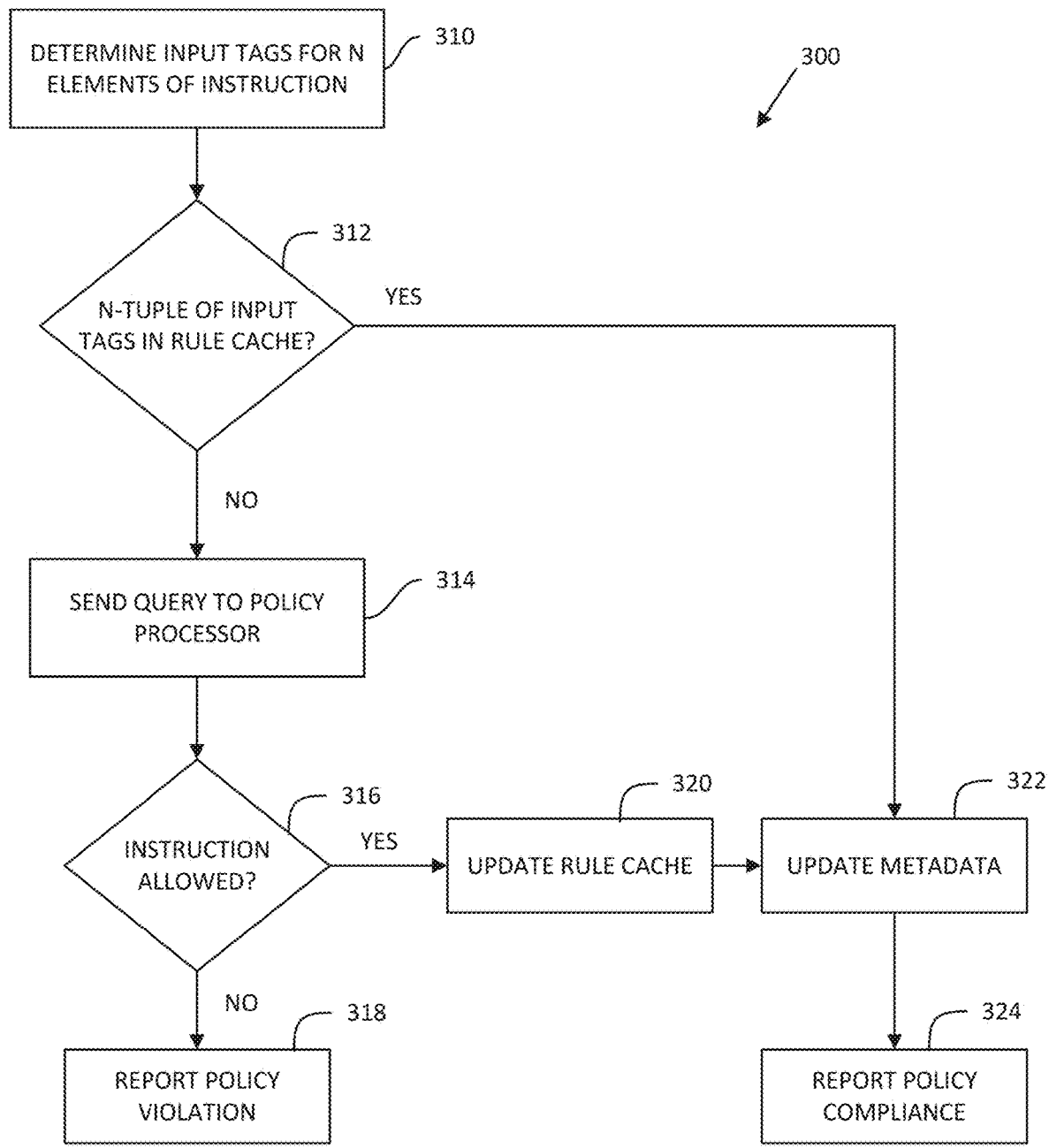
FIG. 3 shows a process 300 for processing metadata based on one or more policies, in accordance with some embodiments.

FIG. 3 illustrates a process 300 for evaluating one or more input tags based on one or more policies, in accordance with some embodiments. Process 300 begins in act 310, where input tags for each of N elements associated with the instruction and relevant for evaluating compliance with the one or more policies are determined. For instance, the N elements may include, an instruction type (e.g., opcode), a program counter, an application memory address from which the instruction is fetched (e.g., a word in memory to which the program counter points), a register in which an operand of the instruction is stored, and/or an application memory address referenced by the instruction. Process 300 then proceeds to act 312, where it is determined whether the N-tuple of tags determined in act 310 has a matching entry in the rule cache 144.

If it is determined that there is a match (e.g., the N-tuple of input tags has been previously evaluated by the policy processor 150, and no policy violation was found), process 300 proceeds to act 322, where one or more output tags received from the rule cache 144 and/or the policy processor 150 may be used to update the metadata memory 125, the tag map table 142, and/or the tag register file 146 (e.g., as described above). Process 300 then proceeds to act 324, where compliance with one or more policies is reported, for example, using one or more of the techniques described above for a cache hit. As described above, using a rule cache in this manner provides for a performance enhancement in which the policy processor 150 may not be invoked for each instruction to process a corresponding N-tuple of input tags.

If it is determined in act 312 that the N-tuple of input tags does not have a match in the rule cache, process 300 proceeds to act 314, where a query may be constructed based on the N-tuple of input tags and submitted to the policy processor 150. Process 300 then proceeds to act 316 where the policy processor 150 determines whether the instruction is in compliance with one or more policies. If it is determined in act 316 that the instruction violates one or more policies, process 300 proceeds to act 318 where a policy violation is reported and an appropriate action is taken (e.g., to prevent a result of executing the instruction from being written back to the application memory 120). If it is determined in act 316 that no policy violation is found and therefore the instruction should be allowed, process 300 proceeds to act 320, where the rule cache 144 is updated by, for instance, adding an entry in the rule cache indicating that the particular N-tuple of input tags resulted in policy compliance. Process 300 then proceeds to act 322, where metadata update is performed, and act 324, where policy compliance for the instruction and its corresponding N-tuple of input tags is reported, as described above.

Although details of implementation are shown in FIG. 3 and described above, it should be appreciated that such details are provided solely for purposes of illustration. For instance, in some embodiments, no output tag may be provided by the rule cache 144 or the policy processor 150, and therefore no metadata update may be performed.

In some embodiments, the rule cache 144 may be implemented with a hash function and a designated portion of a memory (e.g., the metadata memory 125). For instance, a hash function may be applied to one or more inputs to the rule cache 144 to generate an address in the metadata memory 125. A rule cache entry corresponding to the one or more inputs may be stored to, and/or retrieved from, that address in the metadata memory 125. Such an entry may include the one or more inputs and/or one or more corresponding outputs, which may be computed from the one or more inputs at run time, load time, link time, or compile time.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
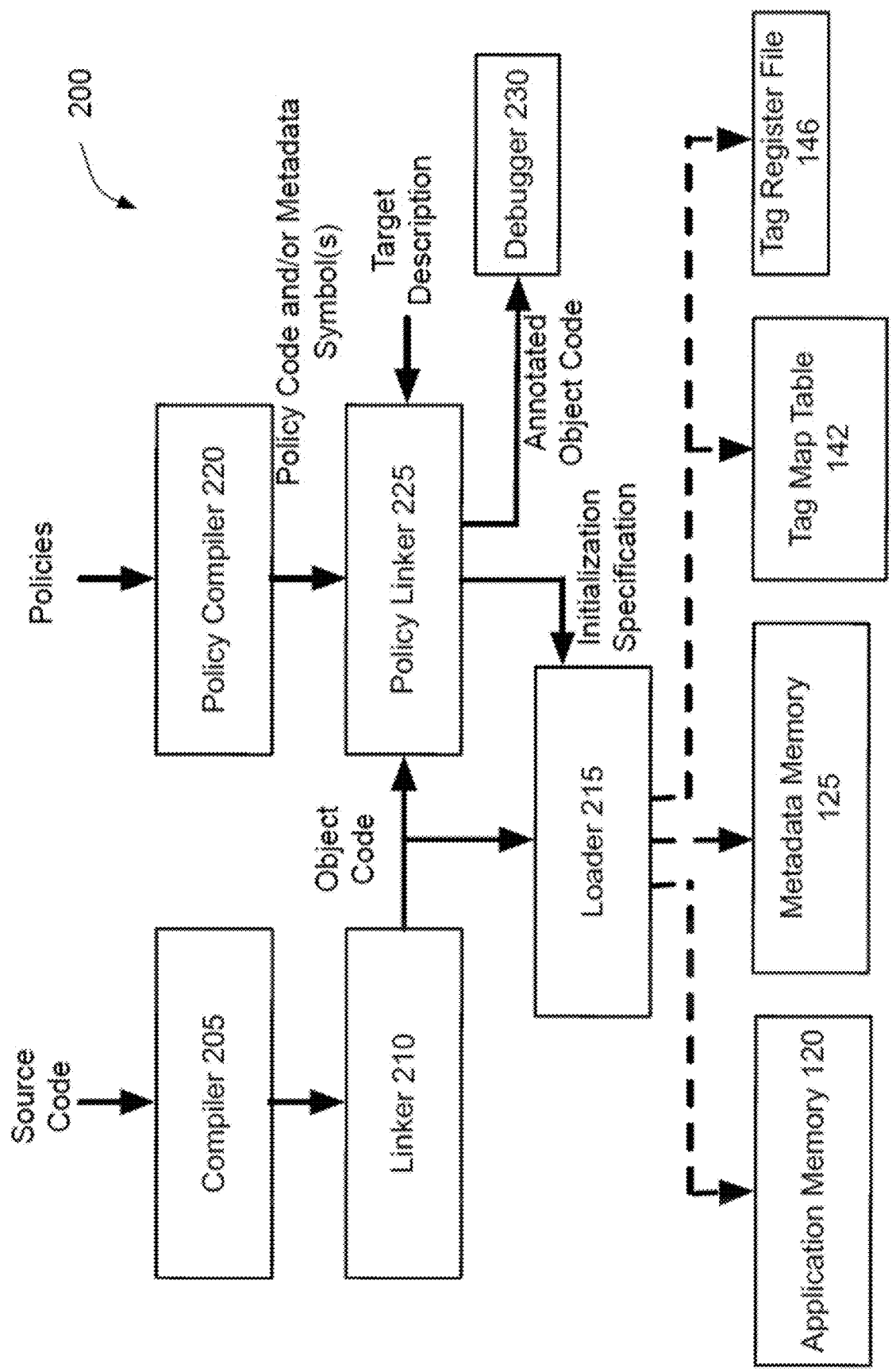
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 shown in FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as "frame" locations, and as function epilogue instructions execute, the "frame" tags may be removed. The stack policy may indicate that instructions implementing a body of the function (as opposed to function prologue and function epilogue) only have read access to "frame" locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate a policy written in a policy language into policy code. For instance, the policy compiler 220 may output policy code in C or some other suitable programming language. Additionally, or alternatively, the policy compiler 220 may output one or more metadata symbols referenced by the policy. At initialization, such a metadata symbol may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "tag."

It should be appreciated that aspects of the present disclosure are not limited to resolving metadata symbols at load time. In some embodiments, one or more metadata symbols may be resolved statically (e.g., at compile time or link time). For example, the policy compiler 220 may process one or more applicable policies, and resolve one or more metadata symbols defined by the one or more policies into a statically defined binary representation. Additionally, or alternatively, the policy linker 225 may resolve one or more metadata symbols into a statically defined binary representation, or a pointer to a data structure storing a statically defined binary representation. The inventors have recognized and appreciated that resolving metadata symbols statically may advantageously reduce load time processing. However, aspects of the present disclosure are not limited to resolving metadata symbols in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 shown in FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata symbols, and the policy linker 225 may search the target description to identify entities having those entity names. The policy linker 225 may identify descriptions of those entities from the target description, and use the descriptions to annotate, with appropriate metadata symbols, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description (or simply ignore) entity descriptions with no corresponding "init" statement.

In some embodiments, the loader 215 may initialize a target system based on an initialization specification produced by the policy linker 225. For instance, with reference to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

In some embodiments, the policy linker 225 and/or the loader 215 may maintain a mapping of binary representations of metadata back to human readable versions of metadata labels. Such a mapping may be used, for example, by a debugger 230. For instance, in some embodiments, the debugger 230 may be provided to display a human readable version of an initialization specification, which may list one or more entities and, for each entity, a set of one or more metadata labels associated with the entity. Additionally, or alternatively, the debugger 230 may be programmed to display assembly code annotated with metadata labels, such as assembly code generated by disassembling object code annotated with metadata labels. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

With reference again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation. In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input tags to output tags, and, in some embodiments, the input tags may be metadata memory addresses where binary representations of metadata are stored, as opposed to the binary representations themselves. The inventors have recognized and appreciated that if a same binary representation of metadata is stored at two different metadata memory addresses X and Y, the rule cache 144 may not "recognize" the metadata memory address Y even if the rule cache 144 already stores a mapping for the metadata memory address X. This may result in a large number of unnecessary rule cache misses, which may degrade system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the metadata memory 125), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150). If the binary representation of metadata has already been stored, a reference to the existing storage location may be used (e.g., installed in the illustrative rule cache 144).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored. Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and discussed in greater detail below may be implemented in any of numerous ways, as the techniques are not limited to any particular manner of implementation. Examples of implementation details are provided herein solely for illustrative purposes. Furthermore, the techniques disclosed herein may be used individually or in any suitable combination, as aspects of the present disclosure are not limited to the use of any particular technique or combination of techniques.

For instance, while examples are discussed herein that include a compiler (e.g., the illustrative compiler 205 and/or the illustrative policy compiler 220 in the example of FIG.

2), it should be appreciated that aspects of the present disclosure are not limited to using a compiler. In some embodiments, a software toolchain may be implemented as an interpreter. For example, a lazy initialization scheme may be implemented, where one or more default symbols (e.g., "UNINITIALIZED") may be used for tagging at startup, and a policy processor (e.g., the illustrative policy processor 150 in the example of FIG. 1) may evaluate one or more policies and resolve the one or more default symbols in a just-in-time manner.

In some embodiments, application data may flow between registers and/or memory in a computing system via host processor instructions (e.g., load, store, move, etc.). A metadata processing system (e.g., the illustrative hardware system 100 in the example of FIG. 1 and/or the illustrative software system 200 in the example of FIG. 2) may be provided that is configured to enforce a set of policies as the application data flows within the computing system. For instance, the metadata processing system may, as the application data flows within the computing system, associate metadata with the application data, and/or update such metadata, according to the policies. As long as all of the application data stays within the computing system, the policies may be enforced based on the metadata maintained by the metadata processing system.

The inventors have recognized and appreciated that, in addition to flowing within a computing system (e.g., a System-on-Chip), application data may also flow outside of the computing system (e.g., off chip), such as to persistent storage (e.g., flash memory or disk) and/or over a network to another system such as network-attached storage or another computing system, which may be configured to enforce different policies and/or different versions of the same policies. It may be useful to preserve the metadata associated with the application data as the application data leaves the computing system, so that the metadata may be made available again, for instance, when the application data is loaded back into the computing system from the persistent storage, and/or when the application data arrives at the other computing system.

The inventors have recognized and appreciated various challenges in such applications of the techniques described herein. For instance, challenges may arise to preserve metadata created by one system in such a way that the metadata may be meaningfully used for policy enforcement by another system, and/or by the same system at a different point in time. As one example, it may be desirable to know which metadata label is associated with which portion of application data when the application data is transmitted to another system, and/or when the application data is stored to, and subsequently retrieved from, persistent storage. Accordingly, in some embodiments, techniques are provided to maintain a correct association between application data and corresponding metadata. For instance, one or more cryptographic techniques (e.g., hashing) may be used to bind the application data with the corresponding metadata.

As another example, different systems (or a same system at different points in time) may use different metadata encodings, so that a same metadata label may have different binary representations. Accordingly, in some embodiments, techniques are provided to encode metadata appropriately, so that semantics of the metadata may be preserved. For instance, canonical representations may be used for metadata in transit and/or in storage.

As another example, different systems (or a same system at different points in time) may use different policies and/or different versions of a same policy. Accordingly, in some embodiments, techniques are provided to check compatibility between metadata from a first system, which metadata may be created and/or maintained for a first policy (or one version of a first policy) and a second policy (or a second version of the same policy) that is being enforced in a second system. In some embodiments, when an incompatibility is detected, first metadata from the first system may be transformed into second metadata that is suitable for use in policy enforcement in the second system. Such transformations may be performed, for example, using a mapping between the first and second metadata.

As another example, metadata may be modified in transit and/or in storage, either accidentally or due to intentional tampering. Accordingly, in some embodiments, techniques are provided to check integrity of metadata received via a network and/or retrieved from storage.

Illustrative implementations of the aforementioned techniques and other techniques are described in more detail below. However, it should be appreciated that aspects of the present disclosure are not limited to any particular manner of implementation.

Figure 4:
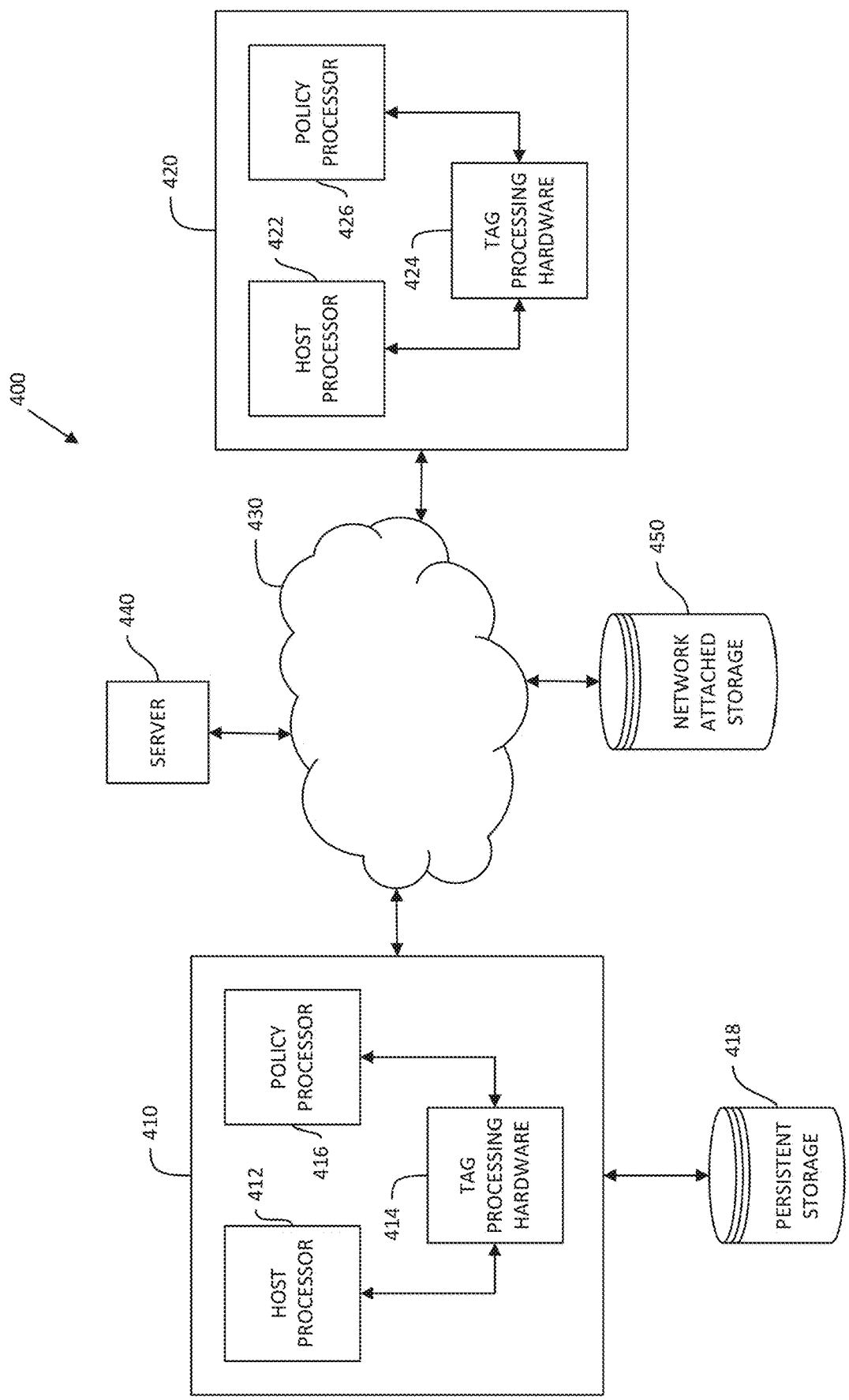
FIG. 4 shows a networked system 400 within which aspects of the techniques described herein may be used.

FIG. 4 shows an illustrative networked system 400 within which one or more aspects of the policy enforcement techniques described herein may be used. In this example, networked system 400 includes a first computing system 410 and a second computing system 420 in communication with first computing system 410 via one or more networks 430. An example implementation of first computing system 410 may be the illustrative hardware system 100 shown in FIG. 1, which may be programmed by the illustrative software system 200 shown in FIG. 2 to provide policy enforcement in accordance with one or more of the techniques described herein.

In the example of FIG. 4, first computing system 410 includes a host processor 412 configured to execute instructions that use application data, tag processing hardware 414 configured to check instructions being executed by the host processor 412 for compliance with one or more policies, and policy processor 416 configured to process queries from the tag processing hardware 414 to check if an instruction executed by the host processor 412 should be allowed based on one or more policies loaded into the policy processor 416. Each of these components is described in detail with regard to the illustrative hardware system 100 in FIG. 1. Although not shown in FIG. 4, first computing system 410 may also include one or more of the other illustrative components described in connection with FIG. 1 (e.g., an application memory, a metadata memory, etc.).

Application data and corresponding metadata created and stored by the first computing system 410 may be transferred from the first computing system 410 to one or more other components of networked system 400. For example, application data and corresponding metadata may be transferred to persistent storage 418 in communication with, but located outside of, the first computing system 410.

As another example, application data and corresponding metadata may be transferred from the first computing system 410 over network 430 to network attached storage (NAS) 450, which may be accessible by multiple computing systems including first computing system 410 and second computing system 420. In some embodiments, NAS 450 may include a controller that includes a processor programmed to protect application data using one or more of the metadata processing techniques described herein.

As yet another example, application data and corresponding metadata may be transferred from the first computing system 410 to the second computing system 420 via network 430.

Additionally, or alternatively, application data and corresponding metadata stored by other components of network system 400 (e.g., persistent storage 418, network attached storage 450, second computing system 420, etc.) may be received by the first computing system 410, where the received application data may be used by instructions executed by host processor 412.

In the example of FIG. 4, networked system 400 also includes server 440 in communication with the first computing system 410 and the second computing system 420 via network 430. Server 440 may be used as a central authority to facilitate one or more aspects of data lifecycle protection in accordance with the techniques described herein. In some embodiments, server 440 may facilitate metadata integrity protection. For instance, server 440 may store and/or coordinate sharing of one or more keys used for encrypting metadata and/or associated application data during storage and/or transfer between different components of networked system 400.

Additionally, or alternatively, server 440 may facilitate binding between application data and corresponding metadata. For instance, server 440 may make available a hashing function used to hash together the application data and the corresponding metadata, and/or make available a public key that may be used to check a signature on the hash.

Additionally, or alternatively, server 440 may facilitate canonicalization of metadata. For instance, server 440 may provide a mapping between metadata labels and binary representations of the metadata labels under a selected encoding (e.g., a canonical encoding), and/or a mapping between binary representations under two different encodings.

Additionally, or alternatively, server 440 may facilitate storage and/or lookup of metadata. For instance, a piece of application data may be assigned an identifier (e.g., a globally unique identifier, a hash, etc.) that may be used to look up, from server 440, metadata associated with that piece of application data. Additionally, or alternatively, to perform a metadata update, server 440 may be queried using an identifier of a piece of application data for which the metadata update is to be performed (e.g., via insert, delete, and/or modify queries). Such storage and/or lookup of metadata may be done at any suitable granularity, for example, for every application data file, every word of application data, etc.

Additionally, or alternatively, server 440 may facilitate identity management (e.g., for access control purposes). For instance, the second computing system 420 may receive application data from the first computing system 410 and/or the network attached storage 450, where the application data may be associated with metadata indicating that the application data may be read by one or more entities. If the second computing system 420 is unable to recognize an entity identifier indicated in the metadata, the second computing system 420 may query the server 440 to map the entity identifier to an entity known to the second computing system 420.

Additionally, or alternatively, server 440 may facilitate metadata compatibility within networked system 400. For instance, server 440 may be configured to service queries from one or more computing systems in networked system 400 to map metadata created and/or maintained in accordance with a first policy (or a first version of policy) to metadata that may be referenced when enforcing a second policy (or a second version of the same policy).

In some embodiments, if a computing system receives metadata from another component within networked system 400 (e.g., from persistent storage, network attached storage, another computing system, etc.), the computing system may determine whether to maintain the received metadata with corresponding application data. In some instances, the received metadata may be maintained even if the received metadata is not relevant for any policy being enforced in the computing system at that point in time. Such metadata may simply be stored and/or forwarded along with the corresponding application data.

For instance, the first computing system 410 may receive application data from an input channel identified as Top Secret, and may tag the application data with metadata that captures this provenance information (i.e., having been received from an input channel identified as Top Secret). As the application data moves through the first computing system 410, the provenance metadata may be maintained. In some embodiments, such creation and/or maintenance of provenance metadata may be done even if no provenance check is performed by any policy being enforced in the first computing system 410 at that point in time. Subsequently, the application data and the associated provenance metadata may be sent to the second computing system 420, which may enforce a policy that does perform provenance checks. Additionally or alternatively, the application data and the associated provenance metadata may be stored and later retrieved by the first computing system 410 when a new policy is enforced that does perform provenance checks.

The inventors have recognized and appreciated that a large amount of metadata may be accumulated as a piece of application data moves through computation in one or more systems. For instance, a trace of operations performed on a piece of application data, with or without timestamps for the operations, may be maintained. It may be impractical to maintain so much information on every piece of application data. Accordingly, in some embodiments, a suitable trade off may be made between information and performance. For example, more information may be maintained for application data that is deemed to be critical.

In some embodiments, metadata created and/or maintained in accordance with a first policy (or a first version of a policy) may be used to derive metadata that may be referenced when enforcing a second policy (or a second version of the same policy). For instance, a computing system may receive metadata from another component within networked system 400 (e.g., from persistent storage, network attached storage, another computing system, etc.), and may determine that the received metadata is created in accordance with a first version of a confidentiality policy that is different from a second version that is being enforced in the computing system. As an example, under the first version (e.g., version 1.0), a piece of application data may be tagged as Confidential if the piece of application data was read from a selected input/output port. By contrast, under the second version (e.g., version 1.2), a piece of application data may be tagged as Confidential if the piece of application data was read from the selected input/output port and was read on behalf of one or more selected agents.

In response to detecting a version discrepancy, the computing system may first try to determine whether it is able to resolve the version discrepancy. For example, the computing system may be configured to store a mapping for providing backward compatibility of policy versions. For instance, policy version 1.2 may include one or more upgrade rules indicating how to transform and/or interpret metadata created from one or more older policy versions (e.g., policy version 1.0 or 1.1) appropriately under policy version 1.2.

In some embodiments, transformation of the received metadata may be triggered automatically upon loading of the received metadata by the computing system. Additionally, or alternatively, the received metadata may be retained upon loading, but may later be interpreted in such a way that takes into account the version discrepancy. Thus, an upgrade rule may be applied upon loading of the received metadata, and/or when the received metadata is referenced by an active policy version.

Referring to the above example, an upgrade rule may check if information is available regarding an agent on behalf of which the application data was read. If such information is available, the upgrade rule may check if the agent is among the one or more selected agents. If so, the application data may be treated as being confidential under policy version 1.2. Otherwise, a policy violation may be flagged (e.g., with an error message indicating there is insufficient information for evaluating confidential status).

In some embodiments, if the computing system is unable to resolve a version discrepancy, the computing system may issue a query to a central authority (e.g., server 440 or some other component of networked system 440) for a mapping (e.g., one or more rules) that will enable the computing system to transform and/or interpret the received metadata appropriately under a version of the policy being enforced by the computing system. In response to the query, an appropriate mapping may be downloaded from the server to the computing system that issued the query, and the computing system may use the mapping to transform and/or interpret the received metadata.

As described above, second computing system 420 may receive application data and corresponding metadata from first computing system 410 and/or from network attached storage 450. Second computing system 420 may include components similar to first computing system 410 such as a host processor 422, tag processing hardware 424, and policy processor 426. Second computing system 420 may also include one or more other components (e.g., application memory and/or metadata memory) examples of which are shown and discussed in connection with the illustrative hardware system 100 in FIG. 1. Tag processing hardware 424 may be configured to use the metadata received over network 430, which may have been generated in accordance with one or more policies enforced by the first computing system 410, to derive metadata that may be referenced by one or more policies enforced by the second computing system 420. Additionally, or alternatively, the tag processing hardware 424 may be configured to perform metadata update in accordance, for instance, with the process 300 shown in FIG. 3, when the host processor 422 performs an instruction that uses corresponding application data.

In some embodiments, the metadata received by the second computing system 420 may be created and/or maintained according to a different version of a policy currently enforced by the policy processor 426 of the second computing system 420. In such an instance, the policy processor 426 may determine whether it is able to resolve the version discrepancy. For instance, the policy processor 426 may be enforcing a newer version of the policy (e.g., policy version 1.2), and may include one or more policy rules that provide backward compatibility for transforming metadata created with one or more earlier versions of the policy (e.g., policy version 1.0). Thus, if the received metadata is associated with policy version 1.0, the policy processor 426 may be able to transform the received metadata into metadata useable by the second system in enforcing policy version 1.2.

However, if the received metadata was created and/or maintained according to a policy version that is newer than the version of the policy being enforced by the policy processor 426, the policy processor 426 may not be able to interpret the received metadata properly to be able to provide policy enforcement. In such instances, the policy processor 426 may issue a query to a central authority (e.g., server 440) or another computing system (e.g., first computing system 410) for information about how to interpret metadata to be able to properly enforce the policy on the second computing system.

As described above and in the examples below, some embodiments protect the integrity of metadata transferred between different components of networked system 440 by encrypting the metadata using any suitable cryptographic techniques, examples of which are discussed herein. Accordingly, second computing system 420 may be configured to decrypt metadata received, for example, from network attached storage 450 and/or first computing system 410. Once decrypted, the metadata may be used for policy enforcement using one or more of the techniques described herein. Decryption may additionally be performed by first computing system 410 when receiving metadata across the network 430 and/or when retrieving metadata from persistent storage 418 even when such metadata is not transferred over the network 430.

In some embodiments, prior to transferring metadata to components of networked system 400 outside of the computing system in which the metadata was created and/or modified (e.g., first computing system 410), the metadata may be serialized to, for example, facilitate storage and/or transmission of the metadata along with corresponding application data, and/or interpretability of the metadata by other computing systems (e.g., second computing system 420). For instance, in first computing system 410, a single metadata value (e.g., a 32-bit value) may represent metadata information for multiple policies. The single metadata value may be decomposed into multiple values, each of which represents metadata information for a single policy.

The examples that follow describe non-limiting implementations of data lifecycle protection using persistent metadata in accordance with some embodiments.

Example: Access Control

In some embodiments, an implementation of persistent data is in providing access control to application data. Metadata associated with the application data may be used by a policy enforcement system to determine whether an agent is authorized to access the application data. By allowing the metadata to flow along with the application data to different systems also configured to provide policy enforcement, data lifecycle protection may be implemented.

In Multi-Level Security (MLS), application data may be classified according to different levels of sensitivity. For instance, a classification scheme may include a totally-ordered list: Unclassified, Confidential, Secret, and Top Secret. More complex partial orderings (e.g., a lattice) are also possible.

In some embodiments, along with data classification, MLS may provide authorization, granted based on some authentication mechanism. For instance, levels of authorization may be provided that correspond to levels of sensitivity (e.g., Secret, Top Secret, etc.). To determine whether an agent (e.g., a thread running on behalf of an authenticated user with a particular security clearance) has been granted access to classified data, a set of access control rules may be applied, for instance, based on the Bell-LaPadula Model. In some embodiments, the clearance (e.g., authority) granted to an agent, based on authentication, may be associated with a system register sometimes referred to as the program counter (PC) or environment (ENV). A PC tag may flow with computation and can record the authority granted to the current agent. An access control check may then be a comparison between the authority component of the PC tag and the access control components of the tags associated with data being accessed by a given instruction.

In some embodiments, the set of access control rules may be implemented using one or more of the policy enforcement techniques described herein. For instance, a basic rule may be applied, such as a rule that a thread at a given clearance level is not allowed to read data at a higher classification level. For example, a thread authenticated to a Secret user may not be allowed to read data labeled Top Secret. A rule may be provided to address information flow for secrecy, such as a rule that data resulting from an N-ary operation (e.g., add is a binary operation) is as secret as the most secret of the operation's N operands. For example, adding a Secret number to a Top Secret number produces a Top Secret number.

In some embodiments, MLS may also support both classifying and enforcing integrity, which may indicate a level of trustworthiness of data. For instance, an agent with Secret clearance may produce data with Secret integrity, which may be considered higher than Confidential integrity.

In some embodiments, as different pieces of data with different integrity levels are combined (e.g., adding two numbers), a result may have the lowest of all operand integrity labels. Whereas secrecy may be primarily concerned with limiting where data can flow (e.g., who may be allowed to observe the data), integrity may be primarily concerned with checking whether data is of an expected quality at certain points. For example, at the start of a mission-critical function, all input arguments may be expected to have at least Secret integrity. In some embodiments, a Biba model of integrity enforcement may be used.

In some embodiments, provenance (e.g., where a piece of data came from) is an aspect of integrity. For example, an encryption routine may expect input data that came from a trusted on-board key store and has not been modified since (so performing some bit manipulation on key material may lower the integrity).

The inventors have recognized and appreciated that a metadata processing system may be used to track secrecy and integrity labels of individual words of data as those words flow through memory and a host processor (and/or to other computing systems), enforcing secrecy and/or integrity policies at every instruction.

Example: Saving and Restoring Application Data From Persistent Storage

In some embodiments, an illustrative implementation of persistent metadata is in the context of saving application data and accompanying metadata to, and/or restoring application data and accompanying metadata from, persistent storage such as a disk. However, it should be appreciated that aspects of the present disclosure are not limited to any particular context. For instance, one or more of the techniques described herein may be used in any suitable context in which systems processing the same application data may use different policies and/or different versions of policies for policy enforcement, such as sending data from one system over a network to other systems as described herein.

In some embodiments, as application data is manipulated by a host processor in a first system, a metadata processing system may maintain corresponding metadata securely in a segregated area of memory, so that software (which may be malicious) running on the host processor may not be able to modify the metadata. In this way, the metadata processing system may protect integrity of the metadata by ensuring that only the metadata processing system software may be able to update the metadata. Additionally, or alternatively, metadata may be treated as confidential, and application software may not be allowed to read the metadata.

In some embodiments, when application data and associated metadata is transferred out of a first computing system, e.g., to persistent storage or over a network to another system, one or more cryptographic techniques may be used to protect confidentiality and/or integrity of transferred metadata. Examples of such cryptographic techniques include, but are not limited to:

Encrypting the metadata to protect confidentiality of the metadata;

Generating a cryptographic hash of the metadata and/or the application data to which the metadata is associated, and storing the cryptographic hash. Additionally, or alternatively, a digital signature may be generated over the hash using a private key. At a later time, an association between application data and metadata may be checked, for example, by hashing the application data and the metadata and comparing a result with the stored hash, and/or using a corresponding public key to check the signature on the stored hash;

Generating and storing a digital signature (e.g., a hash encrypted using a private key) of the metadata;

Storing identifiers of one or more policies that most recently created the metadata, so that, when the application data is brought into a computing context later, a check may be performed to determine whether the metadata as stored is compatible with one or more policies in the new context.

In some embodiments, when application data is written to persistent storage, the metadata processing system may intercept the writes and initiate corresponding writes of encrypted and/or unencrypted metadata, hashes, and/or signatures to a designated area of the same persistent storage, or a different persistent storage.

Similarly, when application data is read from persistent storage, the metadata processing system may read from storage and/or decrypt any corresponding metadata, and/or check such metadata for integrity, association, and/or compatibility. In some embodiments, this metadata processing may be completed prior to be the application data becoming accessible in memory.

Example: Loading Executables

In some embodiments, application binaries (e.g., stored on disk) may have associated metadata. When an application binary is loaded into a protected system, one or more of the metadata processing techniques described herein may be used to load metadata associated with words of the application binary. For example, control flow integrity metadata (e.g., indicating to which addresses an instruction may be allowed to jump) or return address metadata (e.g., indicating that an instruction may only jump to a target labeled as a return address) may be associated with individual instructions in an application binary.

In some embodiments, application data and its associated metadata may be loaded simultaneously from persistent storage. For instance, the application memory may be loaded into an application memory associated with a host processor of a computing system, while the metadata may be loaded into a metadata memory in the computing system.

Example: Memory Management

In some embodiments, a virtual memory scheme may be used. When a memory page is stored to disk, the metadata processing system may persist corresponding metadata (e.g., with encryption, hashing, and/or digital signature). When the memory page is retrieved from disk and loaded into memory, the metadata processing system may retrieve, decrypt, and/or check the corresponding metadata. For instance, the metadata may be checked for integrity, association, and/or compatibility.

In some embodiments, the metadata processing system may persist metadata (e.g., with encryption, hashing, and/or digital signature) when a system goes into hibernation and saves memory content to disk. When the system wakes up and loads data from disk back into memory, the metadata processing system may retrieve, decrypt, and/or check the corresponding metadata. For instance, the metadata may be checked for integrity, association, and/or compatibility.

Example: Network Attached Storage

In some embodiments, many authenticated users on systems protected using one or more of the metadata processing techniques described herein may each have access to a Network Attached Storage (NAS) system that is also protected by a metadata processing system. Each connected system may write application data to the NAS with canonicalized and/or serialized metadata, which may be hashed, signed, and/or encrypted. In one instance, a user whose clearance level is Top Secret may write data. Some of the data may be unclassified, some may be secret, and some may be top secret. All of the data may be written to persistent storage with associated serialized, canonicalized, hashed, signed, and/or encrypted metadata. Another user having Secret clearance level (e.g., a clearance level less than "Top Secret"), may attempt to access the data that was just written to the NAS. The Secret user may be authorized to read Secret and Unclassified data but not Top Secret data. As the requested data is streamed out of the NAS, a controller of the NAS protected by the metadata processing system may examine each word and associated metadata. A data pipe from the NAS controller to software running on behalf of the Secret user may be classified as observable at the Secret level. A confidentiality policy may prohibit writing of Top Secret data to a data pipe labeled as observable at the Secret level, but words labelled Secret or Unclassified may be written to the data pipe for observation by the Secret user.

Violations of such a confidentiality rule may be handled in any suitable manner. In some embodiments, no requested data may be returned if a policy violation is found. However, this may cause confusion at downstream software. In some embodiments, data may be passed through a trusted sanitization function. A sanitization function for writing to a Secret data pipe may replace Top Secret data with some default value to indicate that some data has been redacted. An output of such a Secret sanitization function may be labeled Secret or using another clearance level below Secret. Thus, the sanitization function may be given privilege to declassify data.

In some embodiments, one or more of the techniques described above may be used to provide compliance with the U.S. Health Insurance Portability and Accountability Act (HIPAA). For instance, a user not authorized to see patient data may instead see redacted regions corresponding to HIPAA-controlled information.

In some embodiments, application data transmitted between a NAS and client machines may be encrypted. If the NAS is protected using a metadata processing system, then classification metadata may be made available to a NAS server, so that the NAS server may mediate access to classified data between differently-authorized clients. For instance, a metadata processing system on a client machine may maintain original classification metadata even after application data has been encrypted. As an example, before encryption, a word in memory may be labeled {Plaintext, Secret}. After encryption, the word may be labeled {encrypted(Secret), Unclassified} to indicate that the application data, when encrypted, is not classified, but upon decryption an output plaintext should be labeled Secret.

In some embodiments, on a network with both untrusted systems and systems protected via metadata processing, a NAS server may still mediate access to classified data. When a client protected by a metadata processing system is, for example, authenticated as having a Secret classification, the client may be authorized to write data at both the Secret and Unclassified levels. If an unprotected system is authenticated as having a Secret classification, then all data written to the NAS server by the unprotected system may be given a Secret metadata classification.

It should be appreciated that, for clients protected by respective metadata processing systems, metadata accompanying persisted application data may include more than MLS-related information. For example, there may be provenance information (where the application data has come from) and/or type information (e.g., whether a word in the application is an integer, a date, the 9th digit of a phone number, etc.).

It should be appreciated that the techniques disclosed herein may be implemented in any of numerous ways, as the disclosed techniques are not limited to any particular manner of implementation. Examples of details of implementation are provided solely for illustrative purposes. Furthermore, the disclosed techniques may be used individually or in any suitable combination, as aspects of the present disclosure are not limited to the use of any particular technique or combination of techniques.

Illustrative configurations of various aspects of the present disclosure are provided below.

A1. A method for metadata processing, the method comprising acts of: associating, in a first system, metadata with application data processed by a host processor, wherein the application data is protected within the first system by one or more first policies using the metadata; and transferring the application data and its associated metadata to a second system in which the application data is unprotected using metadata processing or is protected by one or more second policies different from the one or more first policies.

A2. The method of A1, further comprising: receiving by the first system, the application data and its associated metadata from the second system; and processing the metadata received from the second system in accordance with the one or more first policies to assess compliance with the one or more policies A3. The method of A2, further comprising: generating a first cryptographic hash of the metadata and the application data; storing the first cryptographic hash in the first system;

and assessing an association between the metadata received from the second system and the application data by: generating a second cryptographic hash of the metadata received from the second system and the application data received from the second system; and comparing the first cryptographic hash and the second cryptographic hash.

A4. The method of A2, further comprising: generating a digital signature of the metadata using a private key prior to transferring the metadata to the second system; and verifying a digital signature of the metadata received from the second system using a public key associated with private key.

A5. The method of A2, further comprising: storing an identifier for each policy of the one or more policies used to create the metadata in the first system; and determining whether the metadata received from the second system is compatible with the one or more policies associated with the stored one or more identifiers.

A6. The method of A1, wherein the metadata includes a metadata value associated with multiple of the one or more policies, and wherein the method further comprises: serializing the metadata value to generate metadata values for each of the multiple policies; and transferring the serialized metadata to the second system.

A7. The method of A1, further comprising: encrypting the application data and/or its associated metadata prior to transferring the application data and its associated metadata to the second system.

A8. The method of A7, wherein encrypting the application data and/or its associated metadata comprises modifying the metadata to indicate an operation to be performed following decryption of the application data.

A9. The method of A8, wherein the operation to be performed comprises associating a particular label with the application data following decryption.

A10. The method of A1, wherein the second system comprises persistent storage.

A11. The method of A1, wherein the second system comprises network-attached storage.

A12. The method A1, wherein the second system comprises a computing system.

A13. The method A1, wherein the metadata describes one or more of a classification, a type of application data, a tag for a program counter, and information about a memory location associated with the application data.

B1. A method for metadata processing, the method comprising acts of: receiving by a second system from a first system, application data and associated first metadata, wherein the first metadata was created in accordance with one or more first policies, and wherein the second system includes a host processor configured to use the application data; processing the first metadata to obtain second metadata to be associated with the application data in accordance with one or more second policies used by the second system for data protection.

B2. The method of B1, further comprising: downloading to the second system from a server, a mapping to transform the first metadata to the second metadata; and processing the first metadata to obtain the second metadata by applying the mapping to the first metadata.

B3. The method of B1, wherein the first metadata received from the first system is encrypted, the method further comprises decrypting the first metadata to produce decrypted first metadata, and processing the first metadata comprises processing the decrypted first metadata.

B4. The method of B3, further comprising: updating the decrypted first metadata based, at least in part, on the one or more second policies.

B5. The method of B4, further comprising: encrypting the updated first metadata; and transferring the encrypted updated first metadata to the first system.

B6. The method of B1, wherein the received first metadata includes respective metadata values for multiple of the one or more second policies, and wherein the method further comprises combining the respective metadata values for the multiple of the one or more second policies into a single metadata value associated with the application data.

B7. The method of B1, wherein the first metadata indicates a classification level of the application data, and wherein the method further comprises: determining whether an agent on the second system is authorized at a classification level at or above the classification level indicated in the first metadata; and permitting the agent to access the application data associated with the first metadata in response to determining that the agent is authorized at a classification level at or above the classification level indicated in the first metadata.

B8. The method of B7, wherein the agent is a processing thread executing on the second system.

B9. The method of B7, further comprising updating the first metadata based, at least in part, on an operation performed on the application data by the second system and the one or more second policies.

B10. The method of B5, further comprising transmitting, via at least one network, the updated first metadata to the first system.

C1. A system comprising circuitry and/or one or more processors programmed by executable instructions, wherein the circuitry and/or the one or more programmed processors are configured to perform the method of any of configurations A1-B10.

C2. At least one computer-readable medium having stored thereon at least one netlist for the circuitry of configuration C1.

C3. At least one computer-readable medium having stored thereon at least one hardware description that, when synthesized, produces the at least one netlist of configuration C2.

C4. The at least one computer-readable medium of configuration C3, wherein the at least one hardware description is in an encrypted form.

C5. At least one computer-readable medium having stored thereon the executable instructions of configuration C1.

Figure 5:
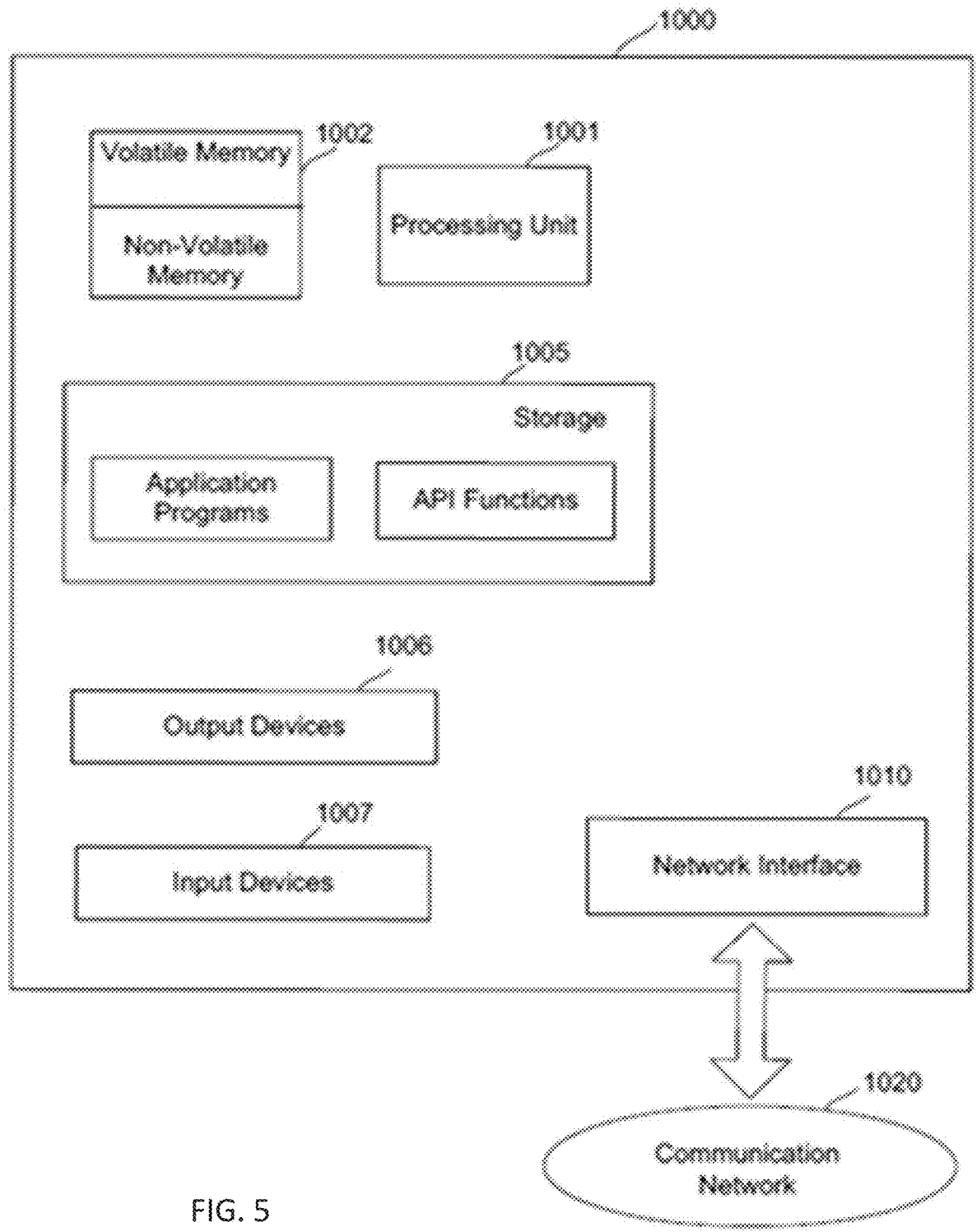
FIG. 5 shows, schematically, an illustrative computer 1000 on which any aspect of the present disclosure may be implemented.

FIG. 5 shows, schematically, an illustrative computer 1000 on which any aspect of the present disclosure may be implemented.

In the example shown in FIG. 5, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1101 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 5. These devices may be used, for instance, to present a user interface. Examples of output devices that may be used to provide a user interface include printers and display screens for visual presentation of output, and speakers and other sound generating devices for audible presentation of output. Examples of input devices that may be used for a user interface include keyboards and pointing devices (e.g., mice, touch pads, and digitizing tablets). As another example, the input devices 1007 may include a microphone for capturing audio signals, and the output devices 1006 may include a display screen for visually rendering, and/or a speaker for audibly rendering, recognized text.

In the example shown in FIG. 5, the computer 1000 also includes one or more network interfaces (e.g., the network interface 1010) to enable communication via various networks (e.g., the network 1020). Examples of networks include a local area network (e.g., an enterprise network) and a wide area network (e.g., the Internet). Such networks may be based on any suitable technology and operate according to any suitable protocol, and may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The invention claimed is:

1. A method for metadata processing in a computer system, the method comprising acts of:
   receiving application data and associated first metadata, wherein the computer system includes a host processor configured to use the application data;
   identifying one or more first policies according to which the first metadata was created;
   determining, based at least in part on the one or more first policies identified, whether the first metadata is compatible with one or more second policies being enforced in the computer system; and in response to determining that the first metadata is not compatible with the one or more second policies being enforced in the computer system, processing the first metadata to obtain second metadata to be associated with the application data for use in enforcing the one or more second policies in the computer system.

2. The method of claim 1, wherein:
the method further comprises an act of obtaining a mapping to transform metadata for the one or more first policy into metadata for the one or more second policy; and
the second metadata is obtained at least in part by applying the mapping to the first metadata.

3. The method of claim 2, wherein:
the one or more first policies comprise a first policy;
the one or more second policies comprise a second policy;
the act of obtaining a mapping to transform metadata for the one or more first policy into metadata for the one or more second policy comprises:
  determining whether the first policy is a newer version of the second policy; and
  in response to determining that the first policy is a newer version of the second policy, querying a server for a mapping to transform metadata for the first policy into metadata for the second policy.

4. The method of claim 1, wherein:
the first metadata is received in encrypted form; and
the act of processing the first metadata comprises:
  decrypting the first metadata to produce first metadata in decrypted form, and
  processing the first metadata in decrypted form to obtain the second metadata.

5. The method of claim 1, further comprising acts of:
receiving a cryptographic signature corresponding to the application data and the first metadata;
determining whether the application data and the first metadata are correctly bound to each other, comprising:
  using a cryptograph public key to check whether the cryptographic signature was generated based on the application data and the first metadata, wherein the cryptographic public key is associated with a source of the application data.

6. The method of claim 1, wherein:
the received first metadata includes respective metadata values for multiple of the one or more first policies;
the metadata values comprise a first metadata value for one of the one or more first policies; and
the act of processing the first metadata to obtain the second metadata comprises processing the first metadata value to obtain a second metadata value for one of the one or more second policies.

7. The method of claim 1, wherein:
the first metadata indicates a first classification level; and
the method further comprises acts of:
  determining whether an agent on the computer system is authorized at a classification level at or above the first classification level indicated in the first metadata; and
  permitting the agent to access the application data associated with the first metadata in response to determining that the agent is authorized at a classification level at or above the first classification level indicated in the first metadata.

8. The method of claim 7, wherein:
the agent comprises a processing thread executing on the computer system.

9. The method of claim 7, wherein:
the application data is received in encrypted form;
the first metadata indicates that the application data in encrypted form has the first classification level; and
the first metadata further indicates that the application data, when decrypted, has a second classification level higher than the first classification level.

10. The method of claim 1, wherein:
the computer system comprises a first computer system; and
the application data and the first metadata are received from a system selected from a group consisting of: a persistent storage within the first computer system, a network-attached storage outside the first computer system, and a second computer system connected to the first computer system via at least one network.

11. The method of claim 1, further comprising an act of:
in response to determining that the first metadata is compatible with the one or more second policies being enforced in the computer system, updating the first metadata based, at least in part, on the one or more second policies and an operation performed on the application data by the computer system.

12. The method of claim 11, wherein:
the first metadata is received in encrypted form,
the method further comprises decrypting the first metadata to produce first metadata in decrypted form; and
the act of updating the first metadata comprises updating the first metadata in decrypted form to obtain updated first metadata in decrypted form.

13. The method of claim 12, further comprising acts of:
encrypting the updated first metadata in decrypted form to obtain updated first metadata in encrypted form; and
transmitting the updated first metadata in encrypted form to a source system from which the first metadata in encrypted form is received.

14. A computer system comprising circuitry and/or one or more processors programmed by executable instructions, wherein the circuitry and/or the one or more programmed processors are configured to perform a method for metadata processing, the method comprising acts of: receiving application data and associated first metadata, wherein the computer system includes a host processor configured to use the application data;
identifying one or more first policies according to which the first metadata was created;
determining, based at least in part on the one or more first policies identified, whether the first metadata is compatible with one or more second policies being enforced in the computer system; and
in response to determining that the first metadata is not compatible with the one or more second policies being enforced in the computer system, processing the first metadata to obtain second metadata to be associated with the application data for use in enforcing the one or more second policies in the computer system.

15. The computer system of claim 14, wherein:
the method further comprises an act of obtaining a mapping to transform metadata for the one or more first policy into metadata for the one or more second policy; and
the second metadata is obtained at least in part by applying the mapping to the first metadata.

16. The computer system of claim 15, wherein:
the one or more first policies comprise a first policy;
the one or more second policies comprise a second policy;
the act of obtaining a mapping to transform metadata for the one or more first policy into metadata for the one or more second policy comprises:
  determining whether the first policy is a newer version of the second policy; and
  in response to determining that the first policy is a newer version of the second policy, querying a server for a mapping to transform metadata for the first policy into metadata for the second policy.

17. The computer system of claim 14, wherein:
the first metadata is received in encrypted form; and
the act of processing the first metadata comprises:
  decrypting the first metadata to produce first metadata in decrypted form, and
  processing the first metadata in decrypted form to obtain the second metadata.

18. The computer system of claim 14, wherein the method further comprises acts of:
  receiving a cryptographic signature corresponding to the application data and the first metadata;
  determining whether the application data and the first metadata are correctly bound to each other, comprising:
    using a cryptograph public key to check whether the cryptographic signature was generated based on the application data and the first metadata, wherein the cryptographic public key is associated with a source of the application data.

19. The computer system of claim 14, wherein:
the received first metadata includes respective metadata values for multiple of the one or more first policies;
the metadata values comprise a first metadata value for one of the one or more first policies; and
the act of processing the first metadata to obtain the second metadata comprises processing the first metadata value to obtain a second metadata value for one of the one or more second policies.

20. The computer system of claim 14, wherein:
the first metadata indicates a first classification level; and
the method further comprises acts of:
  determining whether an agent on the computer system is authorized at a classification level at or above the first classification level indicated in the first metadata; and
  permitting the agent to access the application data associated with the first metadata in response to determining that the agent is authorized at a classification level at or above the first classification level indicated in the first metadata.

21. The computer system of claim 20, wherein:
the agent comprises a processing thread executing on the computer system.

22. The computer system of claim 20, wherein:
the application data is received in encrypted form;
the first metadata indicates that the application data in encrypted form has the first classification level; and
the first metadata further indicates that the application data, when decrypted, has a second classification level higher than the first classification level.

23. The computer system of claim 14, wherein:
the computer system comprises a first computer system; and
the application data and the first metadata are received from a system selected from a group consisting of: a persistent storage within the first computer system, a network-attached storage outside the first computer system, and a second computer system connected to the first computer system via at least one network.

24. The computer system of claim 14, wherein the method further comprises an act of:
  in response to determining that the first metadata is compatible with the one or more second policies being enforced in the computer system, updating the first metadata based, at least in part, on the one or more second policies and an operation performed on the application data by the computer system.

25. The computer system of claim 24, wherein:
the first metadata is received in encrypted form,
the method further comprises decrypting the first metadata to produce first metadata in decrypted form; and
the act of updating the first metadata comprises updating the first metadata in decrypted form to obtain updated first metadata in decrypted form.

26. The computer system of claim 25, wherein the method further comprises acts of:
  encrypting the updated first metadata in decrypted form to obtain updated first metadata in encrypted form; and
  transmitting the updated first metadata in encrypted form to a source system from which the first metadata in encrypted form is received.

27. At least one non-transitory computer-readable storage medium having stored thereon
  executable instructions, which, when executed by at least one processor in a computer system, cause the at least one processor to perform a method for metadata processing, the method comprising acts of:
  receiving application data and associated first metadata, wherein the computer system includes a host processor configured to use the application data;
  identifying one or more first policies according to which the first metadata was created;
  determining, based at least in part on the one or more first policies identified, whether the first metadata is compatible with one or more second policies being enforced in the computer system; and
  in response to determining that the first metadata is not compatible with the one or more second policies being enforced in the computer system, processing the first metadata to obtain second metadata to be associated with the application data for use in enforcing the one or more second policies in the computer system.

28. At least one non-transitory computer-readable medium having stored thereon at least one hardware description for circuitry configured to perform a method for metadata processing in a computer system, the method comprising acts of:
  receiving application data and associated first metadata, wherein the computer system includes a host processor configured to use the application data;
  identifying one or more first policies according to which the first metadata was created;
  determining, based at least in part on the one or more first policies identified, whether the first metadata is compatible with one or more second policies being enforced in the computer system; and
  in response to determining that the first metadata is not compatible with the one or more second policies being enforced in the computer system, processing the first metadata to obtain second metadata to be associated with the application data for use in enforcing the one or more second policies in the computer system.

29. The at least one computer-readable medium of claim 28, wherein the at least one hardware description, when synthesized, produces at least one netlist for the circuitry configured to perform the method for metadata processing in the computer system.

* * * * *